United States Patent
Yoshida et al.

[11] Patent Number: 5,948,336
[45] Date of Patent: Sep. 7, 1999

[54] START-UP PROCEDURE FOR AN UNDERWATER GRANULATING DIE

[75] Inventors: Minoru Yoshida; Hideki Mizuguchi; Nobuhisa Kobayashi; Masaharu Ishida, all of Hiroshima, Japan

[73] Assignee: The Japan Steel Works, Ltd., Tokyo, Japan

[21] Appl. No.: 08/858,893

[22] Filed: May 19, 1997

[51] Int. Cl.⁶ .................................................. B29B 9/06
[52] U.S. Cl. ........................ 264/142; 264/39; 264/169; 425/311
[58] Field of Search .................... 264/142, 40.1, 264/169, 40.6, 39; 425/67, 313, 311

[56] References Cited

U.S. PATENT DOCUMENTS

| | | | |
|---|---|---|---|
| 4,264,553 | 4/1981 | Loo | 264/142 |
| 4,764,100 | 8/1988 | Lambertus | 425/67 |
| 5,143,673 | 9/1992 | Grimminger | 264/142 |
| 5,611,983 | 3/1997 | Ma et al. | 264/142 |

FOREIGN PATENT DOCUMENTS 2814113  10/1979  Germany.
3941418  6/1991  Germany.

*Primary Examiner*—Jan H. Silbaugh
*Assistant Examiner*—Mark Eashoo
*Attorney, Agent, or Firm*—Sughrue, Mion, Zinn, Macpeak & Seas, PLLC

[57] ABSTRACT

An underwater granulating method in which thermoplastic resin material is kneaded and melted by a kneading extruder while the melted resin material is extruded into cooling water from nozzles of a die with its external surface covered with the cooling water, and the resin material extruded in thin strings is cut by a cutter device driven to move along the external surface of the die. The method is characterized by the following steps: increasing the heating magnitude of the die so that the softened resin material filling the neighborhood of the external surface of the nozzles is melted; temporarily stopping the kneading extruder in the heating state where the kneading extruder is supplied with resin material; stopping the cutter device; reducing the heating quantity of the die; covering the external surface of the nozzles with the cooling water in the condition where the resin material filling the neighborhood of the external surface in the nozzles is softened to close the nozzles; and thereafter starting the drive of the cutter device and, at the same time, the drive of the kneading extruder.

2 Claims, 4 Drawing Sheets

START-UP PROCEDURE FOR AN UNDERWATER GRANULATING DIE

BACKGROUND OF THE INVENTION

1. Field of the invention

The present invention relates to an underwater granulating method and an underwater granulating die in which thermoplastic resin material is kneaded, melted and extruded by a screw type kneading extruder so as to be granulated under water, and particularly relates to the improvement of the manner in which it starts.

2. Related art

Generally, an underwater granulating method using a screw type kneading extruder and an underwater granulating apparatus are widely used to granulate a large quantity of thermoplastic resin material, such as polyethylene, polypropylene, etc. from raw powder into pellets. That is, raw powder is supplied to a screw type kneading extruder where it is kneaded and melted, and then extruded as thin strings from nozzles of a die provided on the head of the kneading extruder. The strings are extruded into cooling water at a temperature range of 40 to 80° C. circulating in an underwater granulating apparatus, and at the same time cut by a cutter, so as to be cooled by the cooling water and granulated into granular pellets.

In such an underwater granulating method, there sometimes arises a case where the apparatus must be stopped temporarily due to problems associated with the apparatus, the raw material system or the product system, or due to routine maintenance requirements. In that case, the screw type kneading extruder and the underwater granulating apparatus are stopped temporarily and restarted after a short time after the problem or maintenance has been attended to.

Heretofore, such temporary stopping and restarting of the screw type kneading extruder and the underwater granulating apparatus are performed in the following manner. First, the supply of the raw powder is stopped, and at the same time the screw type kneading extruder is stopped. However, the heating of the resin material remaining in the inside of the extruder is continued so that it remains melted. Next, the cutter is separated away from the die surface and stopped, and the cooling water is exhausted from the underwater granulating apparatus to ensure that the melted resin material in the nozzles is not cooled and solidified by the cooling water. The die surface is kept at a high temperature of about 250° C. without contacting the cooling water, so that the die is kept in a restart condition. In the case of restart, first, the cutter device is driven. Next, steps of returning the cutter to the die surface, supplying and circulating cooling water to the underwater granulating apparatus, and driving the screw type kneading extruder so as to extrude the melted resin material from the die are performed substantially at the same time.

In addition, in the case where the screw type kneading extruder is driven for the first time, or in the case of routine inspection, overhaul or the like is performed (i.e., in the case where driving is performed in the state where no resin material is included) first, an underwater granulating apparatus 3 is separated from the extruder as shown in FIG. 4, so that only the screw type kneading extruder is driven and the melted resin material 12 flows incontinently from nozzles 7 of a die 2. Next, when the melted resin material flowing incontinently is brought into a normal stationary state, the drive of the screw type kneading extruder is stopped while the heating state is maintained, the surface of the die 2 is cleaned, and the underwater granulating apparatus 3 is coupled with the die 2 so as to be brought into a stand-by state. Thereafter, start-up is performed in the same manner as in the above-mentioned case of temporary stoppage.

With temporary stoppage and restart performed in such a manner as mentioned above, a conventional underwater granulating method of thermoplastic resin material has had the following problems.

Because the die surface is kept at a high temperature to keep the resin material in the melted state during stoppage, the resin material contained in the nozzles melts and flows over the die surface. Further, because the screw type kneading extruder is also maintained in the heated state in running, part of the melted resin material filling the upstream portion of the die flows through the nozzles. As a result, a space is produced in the upstream portion in the die, and the air enters the space from the nozzles. As a result, the resin material melted at a high temperature reacts with oxygen in the air and is oxidized, thus deteriorating its quality. Therefore, pre-running of the screw type kneading extruder for eliminating the deteriorated portion of the resin material is performed before start as shown in FIG. 4, so that the resin material extruded from the nozzles is wasted. When the manufacturing facility is 20 ton per hour, the quantity of the wasted materials reaches 300 to 500 kg in two to three minutes running at half speed or lower. In addition, in the case of the stopping conditions where the screw type kneading extruder can run, the screw type kneading extruder is operated temporarily with a minimum number of rotations so as to extrude melted resin material from the nozzles to avoid a space being produced in the upstream portion of the die even in the stop state of the extruder. Also in this case, the extruded resin material is wasted. In either case, because melted resin material is extruded from the nozzles in a period from stop to restart, the underwater granulating apparatus is separated from the die as shown in FIG. 4.

To start the screw type kneading extruder, first, the die surface where the melted resin material flows inconsistently is cleaned out after completion of the pre-running. Next, the underwater granulating apparatus is coupled with the die disposed on the head of the screw type kneading extruder, and the cutter device is driven. Next, the steps of moving the cutter to approach the die surface, supplying and circulating the cooling water to the underwater granulating apparatus, and driving the screw type kneading extruder so as to extrude the melted resin material from the die are performed at substantially the same time. Such a series of starting operations must be performed rapidly before the melted resin material flows from the nozzles. In addition, in these starting operations, the timing relation between supplying and circulating the cooling water to the underwater granulating apparatus and extruding the melted resin material from the die is important. If the cooling water is supplied and circulated too early, the die surface is cooled suddenly so that a difference of temperature arises locally to thereby produce an unevenness in extruding. If the melted resin material is extruded too early, the melted resin material adheres to the cutter, so that granulating is not possible. When the timing is off, the above operations from the pre-running are repeated again thus wasting more resin material and manpower.

Further, wear-resistant material is applied on the die surface to thereby form a hardened layer on the die surface in order to protect against contact by the cutter. Maintained at a high temperature of about 250° C., the hardened layer contacts the cooling water of 40 to 80° C. so as to be cooled suddenly so that this hardened layer receives a thermal impact. Cracks are generated in the hardened layer by repetition of this cooling. This may be one of the causes of separation of the hardened layer.

SUMMARY OF THE INVENTION

An object of the present invention is therefore to solve the foregoing problems, and to provide an underwater granulating method of thermoplastic resin material and an underwater granulating die therefore, by which a screw type kneading extruder and an underwater granulating apparatus can be made to start easily, no resin material is wasted, and no thermal impact is repeatedly experienced by the hardened layer of the die.

According to the present invention, there is provided an underwater granulating method in which thermoplastic resin material is kneaded and melted by a kneading extruder while the melted resin material is extruded into cooling water from nozzles of a die with its external surface covered with the cooling water, and the resin material extruded in thin strings is cut by a cutter device driven to move along the external surface of the die. The method is characterized by the following steps: increasing the heating magnitude of the die so that the softened resin material filling the neighborhood of the external surface of the nozzles is melted; temporarily stopping the kneading extruder in the heating state where the kneading extruder is supplied with resin material; stopping the cutter device; reducing the heating quantity of the die; covering the external surface of the nozzles with the cooling water in the condition where the resin material filling the neighborhood of the external surface in the nozzles is softened to close the nozzles; and thereafter starting the drive of the cutter device and, at the same time, the drive of the kneading extruder.

In more detail, in the above underwater granulating method, the heating quantity of the die is set so that the resin material filling the neighborhood of the external surface in the nozzles is softened in the state where the kneading extruder is stopped.

More specifically, in the above underwater granulating method, the temperature in the periphery of the nozzles is measured at a location near the external surface but in the inside of the die so as to estimate the temperature of the resin material filling the neighborhood of the external surface in the nozzles, and the heating magnitude of the die is set on the basis of the estimation.

The invention is also directed to an underwater granulating die for thermoplastic resin material in which a plate-like body is disposed on the downstream-side head of a kneading extruder through a die holder, the plate-like body having an external surface constituted by a hardened layer, a plurality of sectionally circular nozzles are formed through the plate-like body from an internal surface to the external surface, and a heat-transfer channel is formed near the nozzles in the plate-like body, wherein a thermal sensing portion is provided near the nozzles at least near the external surface inside the hardened layer.

DETAILED DESCRIPTION OF THE PREFERRED EMBODIMENTS

A preferred embodiment of an underwater granulating method of thermoplastic resin material and an underwater granulating die therefore according to the present invention will be described below in detail with reference to the drawings.

Figure 1:
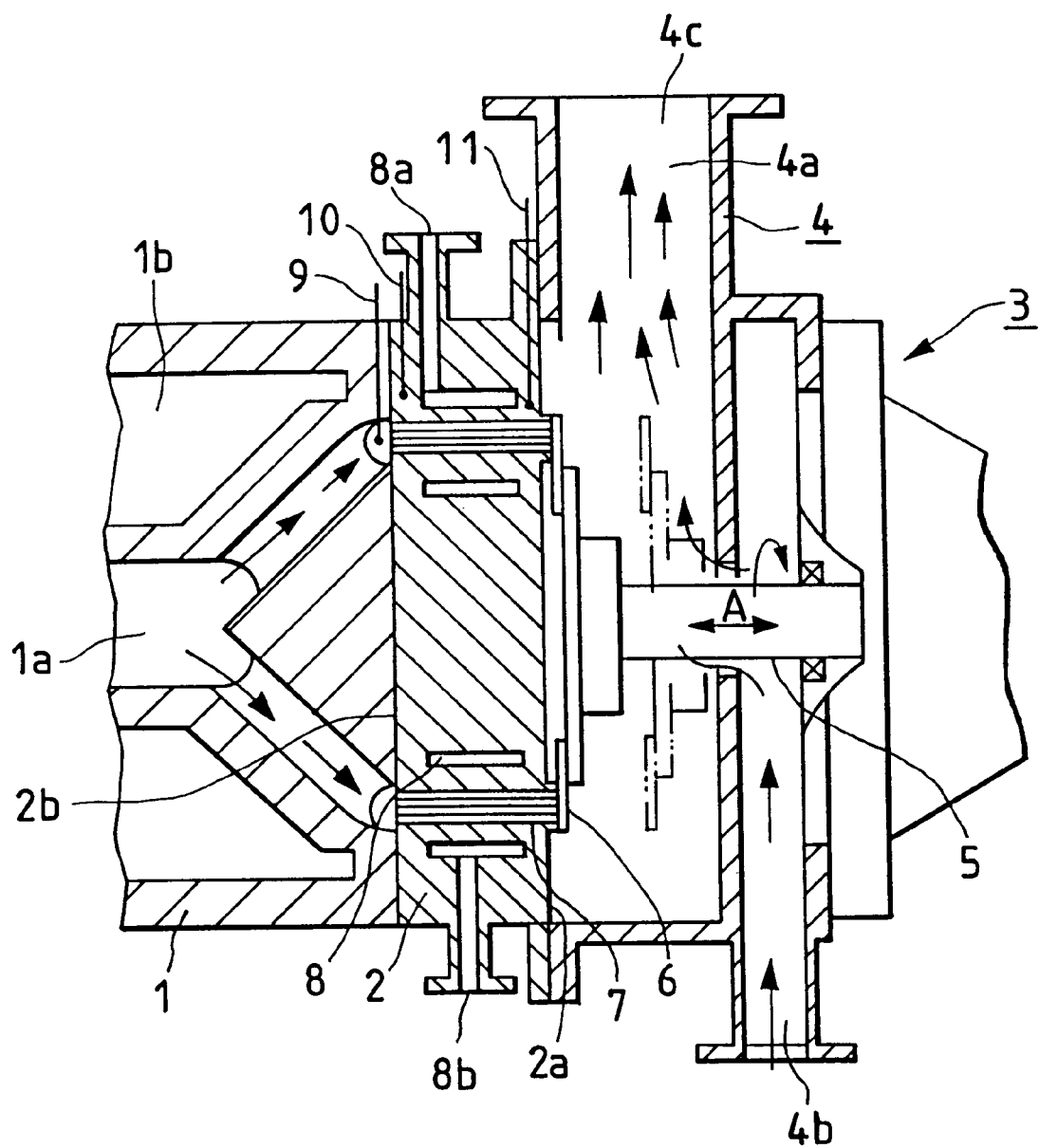
FIG. 1 is a structural sectional view illustrating a granulating portion of thermoplastic resin material, which is a combination of an underwater granulating die and an underwater granulating apparatus, according to the present invention.
Figure 2:
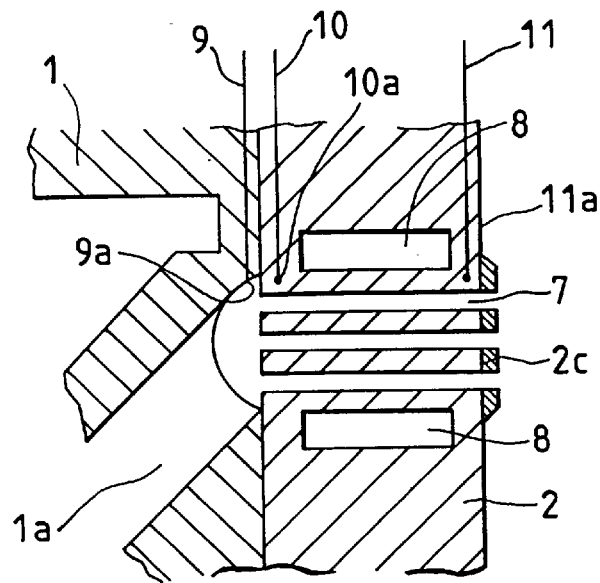
FIG. 2 is an expended sectional view of a main part of FIG. 1.

FIG. 1 is a sectional view illustrating a main part of an underwater granulating apparatus showing an embodiment of the present invention, and FIG. 2 is an expanded sectional view illustrating a heating state of a die. In the drawings, the reference numeral 1 represents a die holder coupled with the head of a not-shown screw type kneading extruder. A resin material channel 1*l* which is opened annularly in the downstream-side end surface of the die holder 1 is formed in the inside of the die holder 1. A heat-transfer channel 1b is provided in the periphery of the resin material channel 1a. A substantially disc-like die 2 is coupled with the downstream-side end surface of the die holder 1. A plurality (large number) of nozzles 7 are formed annularly in the plate surface of the die 2 so as to extend through the die 2 in its thickness direction (i.e., horizontally in FIG. 1), and apertures on the internal surface 2b side of the respective nozzles 7 communicate with the annularly opened resin material channel 1a of the die holder 1. The aperture surfaces of the nozzles 7 project annularly from the external surface 2a to form a hardened layer 2c. In addition, a heat-transfer channel 8, having a supply port 8a and an exhaust port 8b formed in the periphery of the die 2, is provided in the periphery of the nozzles 7. A cutter chamber 4 of an underwater granulating apparatus 3 is coupled with the external surface 2a of the die 2. The cutter chamber 4 is opened in the annular aperture surface of the nozzles 7, and is provided with a cooling water channel 4a which communicates from an inlet 4b to an outlet 4c. A cutter device 5 includes a plurality of cutters 6 driven to rotate along the annular aperture surface of the nozzles 7. The cutter device 5 is also translatable toward and away from the external surface 2a of the die 2 in the cooling water channel 4a in the direction of arrow A. In this embodiment, thermo-couples are provided in three places. That is, there are provided: a first thermocouple 9 which is provided with a temperature-sensing portion 9a located in the resin material channel 1a of the die holder 1, which is the upstream portion of the internal surface 2b of the die 2, so as to measure the temperature of resin material; a second thermo-couple 10 which is provided with a temperature-sensing portion 10a located in the peripheral portion (neighborhood) of the nozzles 7 near the internal surface 2b in the inside of the die 2 so as to measure the temperature of the die 2; and a third thermo-couple 11 which is provided with a temperature-sensing portion 11a located in the peripheral portion (neighborhood) of the nozzles 7 near the external surface 2a in the inside of the die 2 so as to measure the temperature of the die 2. These thermo-couples 9, 10 and 11 may be provided representatively in the resin material channel 1a which opens annularly and in one place in the annular nozzles 7, or may be provided in plurality of places in the annular nozzles.

In the thus configured underwater granulating apparatus, the case of granulating thermoplastic resin material will now be described with reference to FIGS. 1–5. In FIG. 1, first, during operation, high-temperature melted resin material extruded from a not-shown kneading extruder continuously moves in the resin material channel 1a of the die holder 1, flows into the nozzles 7 of the die 2 through the downstream-side annular end surface, and is extruded in the form of thin strings into the cooling water channel 4a a of the cutter chamber 4 through the aperture of the external surface 2a of the die 2. At this time, the cutter device 5 is driven so that the cutters 6 rotate over the aperture of the external surface 2a of the die 2, so that the resin material extruded in the form of thin strings is cut at regular intervals so as to be granulated into pellets. During this operation, in the die holder 1, a high-temperature heat medium is supplied to the heat-transfer channel 1b, so that the melted resin material moving in the resin material channel 1l is heated and kept in the melted state. Similarly, in the die 2, a high-temperature heat medium is supplied to the heat-transfer channel 8 so that the melted resin material moving in the nozzles 7 is heated so as to keep the melted state, that is, to have fluidity. On the other hand, in the underwater granulating apparatus 3, cooling water is supplied to the cooling water channel 4a from the inlet 4b, so that the granulated pellet is cooled and solidified as the cooling water is exhausted from the outlet 4c together with the pellet. Therefore, the external surface 2a of the die 2 is always contacted by the cooling water so that the die 2 is always cooled. However, the heat medium supplied to the heat-transfer channel 8 compensates for the calories taken by the cooling water so as to keep the melted state, that is, the fluidity of the resin material in the nozzles 7.

Figure 3:
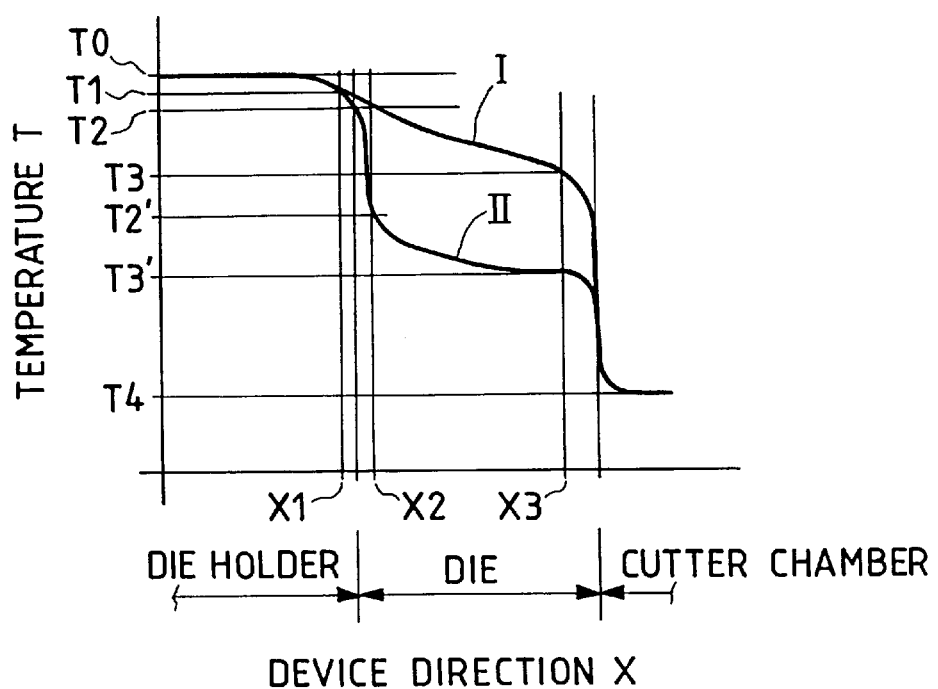
FIG. 3 is diagram showing temperature changes in an apparatus corresponding to FIG. 2.
Figure 4:
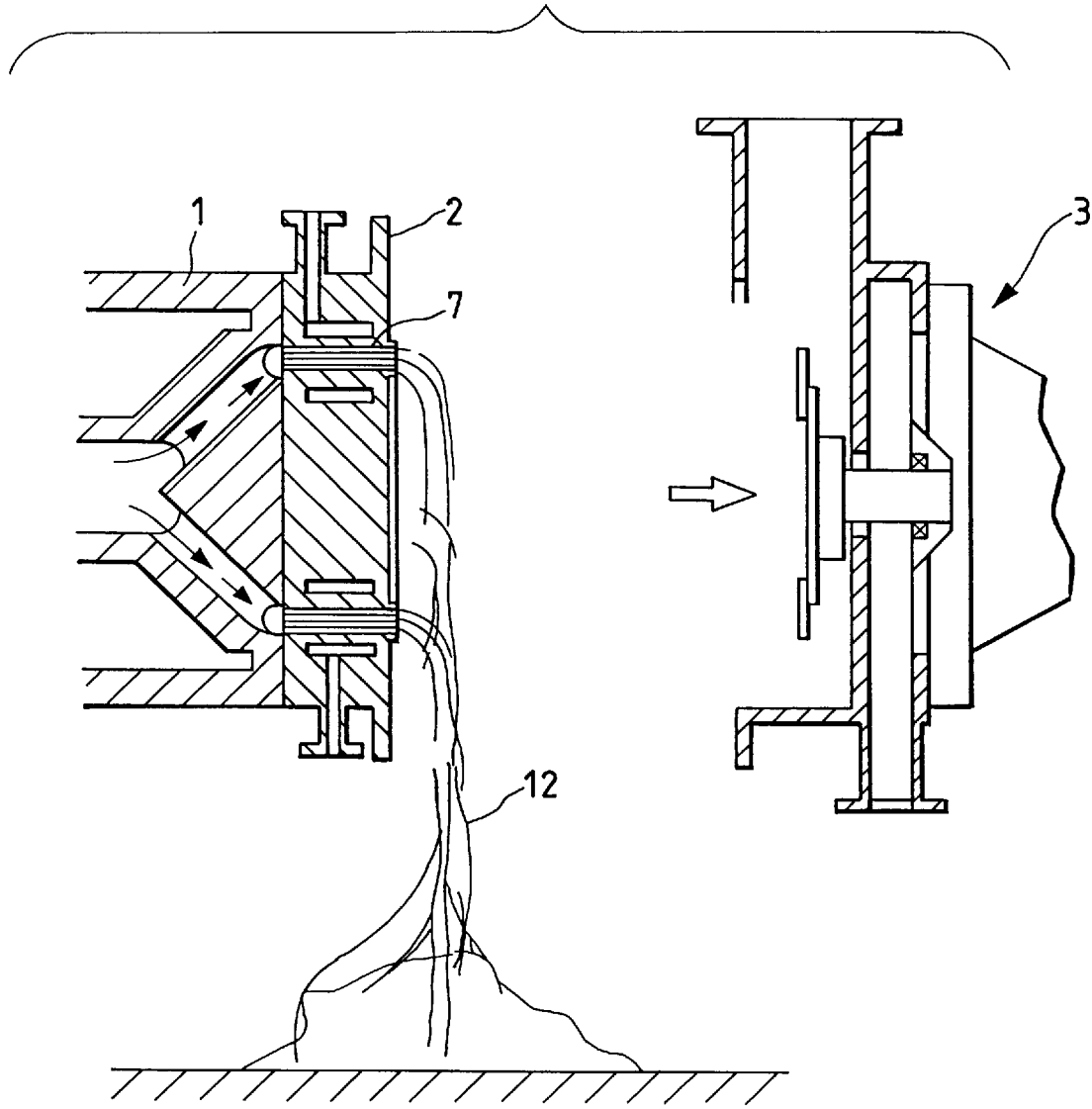
FIG. 4 is a sectional view illustrating a conventional underwater granulating apparatus.
Figure 5:
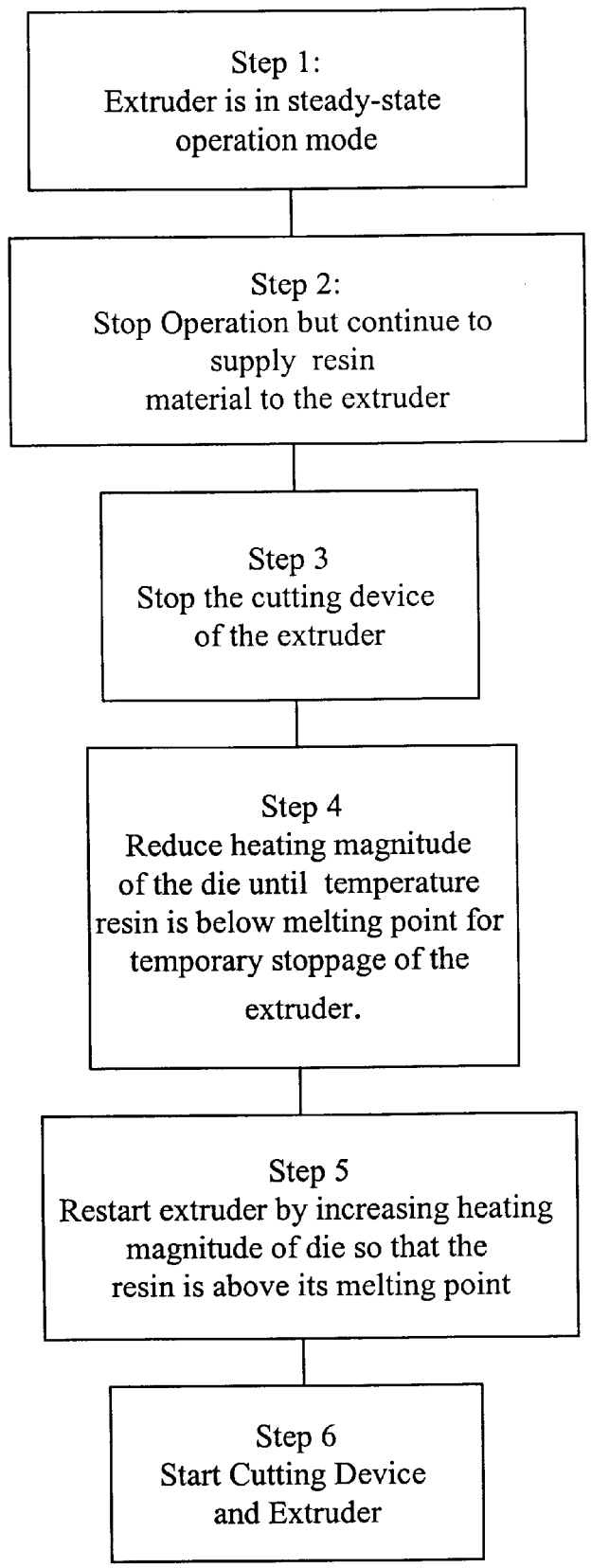
FIG. 5 is a block diagram to assist in understanding the process of the invention.

FIG. 3 shows the relationship between the position and temperature of the resin material in the flowing direction, and the curved line I shows a state in a stationary granulating operation. That is, the temperature of the die holder 1, the die 2 and the cooling water decreases gradually in the order such that it is TO in the die holder 1, T1 in a position XI of the first thermo-couple, T2 in a position X2 of the second thermo-couple in the die 2, and T3 in a position X3 of the third thermo-couple. The temperature decreases suddenly from T3 in the position X3 of the third thermo-couple to T4 in the cooling water through the external surface. The resin material flowing in the die holder 1 and the die 2 is extruded through a temperature change similar to that represented by the curved line I. The resin material is maintained at the melted temperature until immediately before it reaches the external surface 2a of the die 2, where it is then cooled by the cooling water immediately after it is extruded from the external surface 2a so as to be solidified from the outer periphery of its thin-string shape.

Next, to start the underwater granulating apparatus 3, the kneading extruder and the die holder 1 are filled with resin material and heated in the same manner as in the running condition, the heating magnitude of the die 2 is reduced so that the resin material filling the nozzles 7 of the die 2 is softened, and the cutter chamber 4 is filled with cooling water. The rotation of the cutters 6 is stopped and they are separated away from the surface of the die 2 as shown by the chain line in FIG. 1. In this state, the temperature of the die holder 1 and the die 2 changes as shown by the curved line II in FIG. 3. That is, the temperature at the position X2 of the second thermocouple is reduced to T2', and the temperature at the position X3 of the third thermocouple is reduced to T3', as compared to the temperature profile of curved line I in the granulating operation. Thus, the temperature of the resin material in the nozzles 7 is between the melting point and the softening point so that the resin material is kept in the intermediate state between the melted state and the solid state so as to have some fluidity. However, near the external surface 2a in the nozzles 7, the resin material is partially solidified by the cooling water. Therefore, the resin material in the nozzles 7 is partially solidified in the vicinity of the external surface 2a so as to close the apertures of the nozzles 7 to thereby prevent the resin material from flowing out and the cooling water from flowing in. At the same time the other portion is maintained in the softened state in which the resin material is melted easily. For example, in the case of polypropylene, the melting point is. 167 to 170° C., and the softening point is 110 to 120° C., so that the heating quantity of a heat medium is set so that the temperature T3' is in a range of from 120 to 167° C. In the case of high-density polyethylene, the melting point is 120 to 140° C., and the softening point is 60 to 88° C., so that the heating magnitude of a heat medium is set so that the temperature T3' is in a range of from 88 to 120° C. In such a state, first, a heat medium which is massive, for example, 1.5 to 2 times as large as in the stationary operation, is supplied to the heat-transfer channel 8 of the die 2 so as to heat the die 2. When the temperature of the third thermo-couple 11 showing the heating state of the die 2 increases to T3, and hence when the temperature of the second thermo-couple 10 increases to about T2, the cutter device 5 is driven so as to move the cutters 6 approach the external surface 2a of the die 2. Thereafter, the cooling water is circulated, and the kneading extruder is operated. At this time, when the die 2 is heated so that the temperature of the third thermo-couple 11 increases to T3, the resin material in the nozzles 7 becomes in a melted state, that is, becomes flowable, in at least portions contacting with the inner holes of the nozzles 7 except slight portions near the external surface. At this time, if the kneading extruder is operated, the resin material is extruded easily from the nozzles 7 into the cooling water. Then, the resin material is cut by the rotating cutters 6 so as to be granulated sequentially and continuously. When granulating is started, high-temperature melted resin material is extruded continuously, and the heating magnitude required for the die 2 decreases so that the supply quantity of the heat medium is reduced and the temperature change of the curved line I in FIG. 2(b) is maintained.

As has been described above, the underwater granulating apparatus 3 is started as follows. In the case of temporary stoppage during running, as described in above, after the operation is stopped, the heating magnitude of the die 2 is reduced to a stand-by state where the resin material in the nozzles 7 can be kept in the softened state while the cooling water is held in the cutter chamber 4. On the other hand, in the case of starting the running for the first time, the cutter chamber 4 is coupled with the die 2 in the stand-by state after the incontinent flowing operation, the cooling water is held in the cutter chamber 4, and the die 2 is heated to a stand-by state where the resin material in the nozzles 7 is kept in the softened state in the same manner as in the case of the temporary stop.

Although the thermocouples 11 and 10 having their temperature sensing portions disposed near the nozzles 7 are provided in two places of the die 2 (i.e., near the external surface 2a and the internal surface 2b of the die 2 respectively), in this embodiment, at least the thermo-couple 11 having its temperature sensing portion disposed near the external surface 2a may be provided so as to soften the resin material in the nozzles 7 and so as to increase the rate of softening.

Because the underwater granulating method of thermoplastic resin material and the underwater granulating die therefore according to the present invention are configured as described above, it is possible to obtain the following effects.

(1) The operation can be started easily with rare failure and without requiring any complex technique. Specifically, from a stop state in which nozzles of a die are closed by softened resin material in the nozzles, and the external surface of the nozzles are covered with cooling water, the die is heated to make the resin material in the nozzles into a melted state, and then the operations of an underwater granulating apparatus and a kneading extruder are started.

(2) Because the operation can be started with rare failure, no resin material is wasted.

(3) Because no resin material is wasted, not only the yield of products is improved, but also the cost of treating the waste is eliminated.

(4) Because the die is heated to a temperature which is lower than that in the stationary running mode but which can keep the resin material in a softened or viscous state such that it can be melted easily, the calorie transmitted and radiated from the die to the cooling water is less than that in the case where the die is heated to a high temperature in the stationary running mode. Also the calories required for melting the resin material in the nozzles at the time of starting the operation is less than the case where heating the die is stopped completely so that the resin material in the nozzles is solidified. Thus, the time for heating is shortened.

(5) Because the resin material in the nozzles is softened so as to be viscous to close the nozzles completely, and at the same time the external surface of the die is covered with the cooling water, there is no fear that the cooling water will flow into the upstream portion of the die from the nozzles, or that the air will flow into the nozzle to oxidize and deteriorate the resin material.

(6) Because the external surface of the high-temperature die is always covered with the cooling water, there is no fear that the die will receive thermal impacts repeatedly as in the conventional case, so that no cracks due to thermal impacts and no separation due to cracks will occur in a hardened layer.

(7) Because the internal temperature of the underwater granulating die is measured at least in the periphery of the nozzles near the external surface, the temperature of the resin material in the nozzles can be determined more accurately, and the resin material in the nozzles can be kept in the softened or viscous state.

(8) Because a temperature sensing portion is provided near the nozzles at least near the external surface of the underwater granulating die, the temperature near the external surface of the resin material in the nozzles can be estimated.

What is claimed is:

1. A method for granulating a thermoplastic resin material underwater in which the thermoplastic resin material is kneaded and melted by a kneading extruder while said melted resin material is extruded into cooling water from nozzles of a heated die with an external surface of the die covered with said cooling water, wherein said resin material extruded in thin strings is cut by a cutting device driven to move along said external surface of said die, comprising the steps of:

temporarily stopping said kneading extruder from a steady-state operation while said kneading extruder is supplied with said resin material;

stopping the cutting device;

reducing heating of said die such that the temperature of said resin material filling said nozzles in the neighborhood of said external surface is below the melting point of said resin material so as to assume an intermediate state between the melt state and the solid state so as to have fluidity, thereby effectively closing said nozzles for temporary stoppage of extruding of said resin material;

increasing heating of said die so that the temperature of said resin material filling said nozzles in the neighborhood of said external surface is increased from the temperature of said intermediate state to above the melting point so as to melt said resin material; and then starting the drive of said cutting device and at the same time starring the drive of said kneading extruder.

2. A method for granulating a thermoplastic resin material underwater according to claim 1, further comprising measuring the temperature of said resin material in said nozzles at least near said external surface in the inside of die so as to estimate the temperature of said resin material filling said nozzles in the neighborhood of said external surface, and setting the heating of said die on the basis of the measured temperature.

\* \* \* \* \*